United States Patent
Li

(10) Patent No.: US 10,523,106 B2
(45) Date of Patent: Dec. 31, 2019

(54) MULTI-CHANNEL SWITCHING MODE POWER SUPPLY AND CONTROL METHOD THEREOF

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 187 days.

(21) Appl. No.: 15/843,700

(22) Filed: Dec. 15, 2017

(65) Prior Publication Data

US 2018/0175721 A1    Jun. 21, 2018

(30) Foreign Application Priority Data

Dec. 19, 2016 (CN) .......................... 2016 1 1176231

(51) Int. Cl.
*H02M 1/14* (2006.01)
*H02M 1/088* (2006.01)
*H02M 1/00* (2006.01)

(52) U.S. Cl.
CPC ............. *H02M 1/14* (2013.01); *H02M 1/088* (2013.01); *H02M 2001/008* (2013.01); *H02M 2001/009* (2013.01)

(58) Field of Classification Search
CPC .. H02M 1/14; H02M 1/088; H02M 2001/008; H02M 2001/009
USPC .......................................................... 307/31
See application file for complete search history.

(56) References Cited

U.S. PATENT DOCUMENTS

2008/0231115 A1* 9/2008 Cho .......................... H02J 1/08
307/41

OTHER PUBLICATIONS

U.S. Appl. No. 15/665,375, filed Jul. 31, 2017, Monolithic Power Systems, Inc.

* cited by examiner

*Primary Examiner* — Carlos Amaya
(74) *Attorney, Agent, or Firm* — Perkins Coie LLP

(57) ABSTRACT

A method for controlling a multi-channel SMPS having N switching circuits. The method is generating a fast system clock and N load indication signals indicative of load statuses of the N switching circuits, then generating N clock control signals based on the preset pulses of the fast system clock and the N load indication signals. If one of the N switching circuits is detected to transit from a heavy load condition to a light load condition, forming the corresponding clock control signal based on the first pulse of the fast system clock after the corresponding load indication signal transits from the first state to the second state.

20 Claims, 7 Drawing Sheets

MULTI-CHANNEL SWITCHING MODE POWER SUPPLY AND CONTROL METHOD THEREOF

CROSS-REFERENCE TO RELATED APPLICATIONS

This application claims the benefit of CN application 201611176231.3, filed on Dec. 19, 2016, and incorporated herein by reference.

FIELD

The present invention relates to electronic circuits, more specifically, relates to multi-channel switching mode power supply (SMPS) with synchronization function.

BACKGROUND

Multi-channel SMPS is widely used in SSD power systems for it can provide multiple independent output voltages. Multi-channel SMPS comprises a plurality of switching circuits, and each of the plurality of switching circuit may comprise a switch, hereinafter multi-channel SMPS is abbreviated as SMPS. On one hand, when the plurality of switching circuits are in heavy load, and the switches of the plurality of switching circuits are turned on simultaneously, thus each of the plurality of switching circuits draws a current from an input capacitor of the SMPS simultaneously. Accordingly a huge input capacitor is required for the SMPS to ensure that the input voltage of the input capacitor will not drop abruptly. So the switches of the plurality of switching circuits are required to turn on in sequence and the phase differences between each two adjacent switching circuits are required to be the same to decrease the requirement of the input capacitor. On the other hand, when one or more switching circuits are in light load, the switching frequency of the relevant switching circuit is decreased to reduce the output energy of this switching circuit. Further when one switching circuit skips from light load to heavy load, the relevant switch is required to turn on in sequence and the phase differences between each two adjacent switching circuits are required to be the same.

A control method for traditional SMPS is generating a fast system clock at first, and then generating N clock control signals based on the fast system clock to control the relevant switches of the plurality of switching circuits. The drawback of this method is that no matter one switching circuit is in light load or heavy load, the relevant clock control signal is formed at the trigger of the preset pulses of the fast system clock corresponding to the relevant clock control signal, so the output voltage ripple of this switching circuit is big when it is in light load.

So a better method is required to decrease the output voltage ripple when the switching circuit is in light load.

SUMMARY

An embodiment of the present invention discloses a method for controlling a multi-channel SMPS, the multi-channel SMPS comprises N switching circuits for converting an input voltage to N output voltages, each of the N switching circuits has a switch, wherein N is a natural number greater than 1, the method comprises generating a fast system clock based on a preset switching frequency of the multi-channel SMPS; generating N load indication signals by comparing each of the N output voltages separately with a threshold voltage, wherein the N load indication signals having a first state and a second state are configured to indicate load statuses of the N switching circuits respectively; forming N clock control signals based on preset pulses of the fast system clock and the N load indication signals, each of the N clock control signals is configured to control the on moment of the switch in each of the N switching circuits, the N clock control signals have the same frequency as the preset switching frequency and phase difference between every two adjacent clock control signals is (360°/N°); and if one of the N switching circuits is detected to transit from a heavy load condition to a light load condition, forming the corresponding clock control signal based on the first pulse of the fast system clock after the corresponding load indication signal transits from the first state to the second state.

An embodiment of the present invention discloses a multi-channel SMPS, the multi-channel SMPS comprises N switching circuits configured to convert an input voltage to N output voltages, wherein each of the N switching circuits has a switch and N is a natural number greater than 1; a controller configured to generate N clock control signals, wherein each of the N clock control signals is configured to control the on moment of the switch in each of the N switching circuits; and a logic circuit having N control signal generators to provide N switching control signals to control the off moment of the switch in each of the N switching circuits. Wherein the controller comprises a mode detection circuit configured to provide N load indication signals, wherein each of the N load indication signals has a first state and a second state to indicate load status of each of the N switching circuits; a fast system clock generator configured to provide a fast system clock based on a preset switching frequency of the multi-channel SMPS; and a clock adjusting circuit having N flop-flips configured to provide N clock control signals based on the fast system clock and the N load indication signals, the N clock control signals have the same frequency as the preset switching frequency, and phase difference between every two adjacent clock control signals is (360°/N°).

An embodiment of the present invention discloses a controller for controlling a multi-channel SMPS, the multi-channel SMPS having N switching circuits for converting an input voltage to N output voltages, and each of the N switching circuits has a switch, N is a natural number greater than 1, the controller comprises a mode detection circuit configured to provide N load indication signals, wherein each of the N load indication signals has a first state and a second state to indicate load status of each of the N switching circuits; a fast system clock generator configured to provide a fast system clock based on a preset switching frequency of the multi-channel SMPS; and a clock adjusting circuit having N flop-flips configured to provide N clock control signals based on the fast system clock and the N load indication signals, the N clock control signals have the same frequency as the preset switching frequency, and phase difference between every two adjacent clock control signals is (360°/N°).

The use of the similar reference label in different drawings indicates the same of like components.

DETAILED DESCRIPTION

Embodiments of circuits for multi-channel SMPS are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

The phrase "couple" includes direct connection and indirect connection. Indirect connection includes connection through a conductor which has resistance and/or parasitic parameters such as inductance and capacitance, or connection through diode, and so on.

Figure 1:
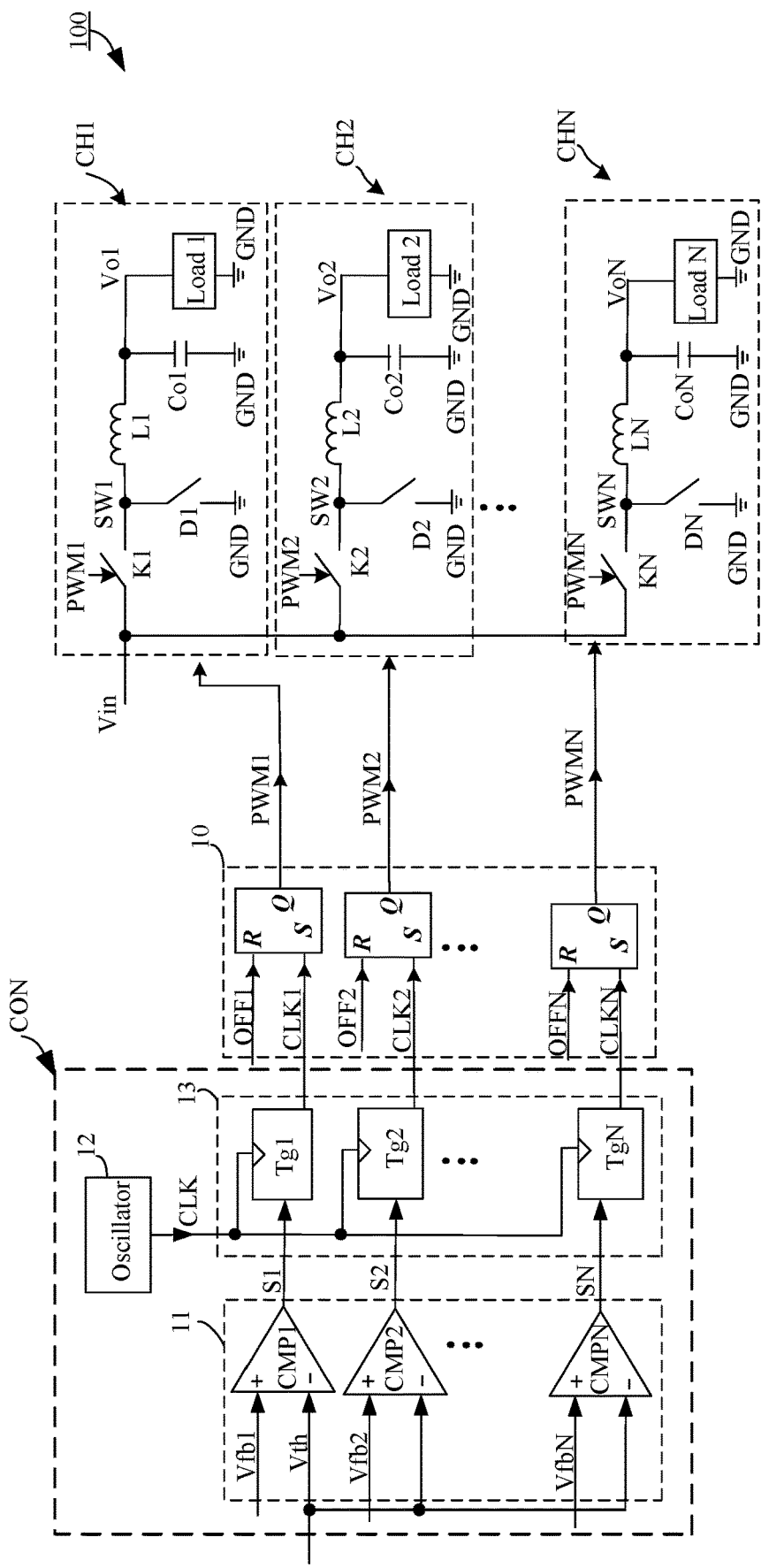
FIG. 1 schematically shows a SMPS 100 in accordance with an embodiment of the present invention.

FIG. 1 schematically shows a SMPS 100 in accordance with an embodiment of the present invention. SMPS 100 comprises N switching circuits CH1, CH2 . . . CHN, a controller CON and a logic circuit 10. In the embodiment shown in FIG. 1, N switching circuits are together coupled to an input terminal to receive an input voltage Vin, and the input voltage Vin may be converted into N output voltages Vo1, Vo2 . . . VoN respectively, where N is a natural number greater than 1.

In the embodiment shown in FIG. 1, N switching circuits are in buck topology, however it should be known that N switching circuits may be in other topologies, such as boost, buck-boost topology, etc. In the embodiment shown in FIG. 1, switching circuit CHi comprises a switch Ki coupled between the input terminal and a switching node SWi, SMPS 100 converts the input voltage Vin in the input terminal to a output voltage Voi by controlling the switching actions of the relevant switch Ki. Switching circuit CHi further comprises a switch Di coupled between the switching node SWi and the reference ground GND and an inductor Li coupled between the switching node SWi and an output capacitor Coi, where the out output capacitor Coi is coupled between the relevant output terminal and the reference ground GND, i is a natural number from 1 to N.

Still referring to the exemplary embodiment shown in FIG. 1, controller CON generates N clock control signals CLK1, CLK2 . . . CLKN to logic circuit 10 to control the on moment of each switch of the N switching circuits based on the parameters of SMPS 100 and the feedback loop of each switching circuit respectively. Controller CON comprises a mode detection circuit 11, a fast system clock generator 12 and a clock adjusting circuit 13. Fast system clock generator 12 generates a fast system clock CLK based on a preset switching frequency $F_{SET}$ of SMPS 100, where the frequency $F_{CLK}$ of the fast system clock CLK and the preset switching frequency $F_{SET}$ of SMPS 100 have an equation illustrated as $F_{CLK}=(M*N)F_{SET}$, M is a natural number greater than or equal to 1. The preset switching frequency $F_{SET}$ of SMPS 100 is the switching frequency of each switch circuit when this switching circuit is in heavy load. Each switching circuit of SMPS 100 has the same frequency as the preset switching frequency $F_{SET}$ when it is in heavy load. In one embodiment, fast system clock generator 12 comprises an oscillator.

Mode detection circuit 11 has N output terminals for providing N load indication signals S1, S2 . . . SN with a first state and a second state to indicate the load status of each switching circuit respectively. In one embodiment, if load indication signal Si transits between the first state and the second state in several successive periods of the fast system clock CLK, the relevant switching circuit is in light load. If the load indication signal Si stays in the second state for several successive periods of the fast system clock CLK, the relevant switching circuit is in heavy load. In one embodiment, if load indication signal Si stays in the second state for L successive periods of the fast system clock CLK, the relevant switching circuit enters to heavy load, where L is a natural number greater than or equal to 1. In one embodiment, mode detection circuit 11 comprises N load detecting circuits CMP1, CMP2 . . . CMPN, and each load detecting circuit comprises a comparator. Each comparator has a first input terminal to receive a threshold voltage Vth, a second input terminal to receive a feedback signal Vfbi indicative of the relevant output voltage Voi and an output terminal to output a load indication signal Si to indicate the load status of the relevant switching circuit by comparing the feedback signal Vfbi with the threshold voltage Vth. When N switching circuits are all in heavy load, SMPS 100 works in FULL mode, and when any one of the N switching circuits is in light load, SMPS 100 works in NO-FULL mode.

Clock adjusting circuit 13 generates N clock control signals CLK1, CLK2 . . . CLKN to control the on moments of the N switches K1, K2 . . . KN based on load indication signals S1, S2 . . . SN and the fast system clock CLK respectively. Clock adjusting circuit 13 comprises N flip-flops Tg1, Tg2 . . . TgN, and each flip-flop Tgi has a first input terminal coupled to fast system clock generator 12 to receive the fast system clock CLK, a second input terminal configured to receive the relevant load indication signal Si and an output terminal. Each flip-flop Tgi generates a clock control signal CLKi at the trigger of one pulse of the fast system clock CLK based one load indication signal Si. More specifically, when N load indication signals indicate that N switching circuits are in heavy load, clock adjusting circuit 13 generates N clock control signals CLK1, CLK2 . . . CLKN at the trigger of the preset pulses of the fast system clock CLK corresponding to each clock control signal respectively, N clock control signals CLK1, CLK2 . . . CLKN have the same frequency as the preset switching frequency of the SMPS, and the phase difference between every two adjacent clock control signals CLK1, CLK2 . . .

CLKN is (360°/N°). If one switching circuit works in light load, the effective edges of the relevant clock control signal are no longer formed at the trigger of the preset pulses of the fast system clock CLK corresponding to each clock control signal respectively but formed at the trigger of the first pulse of the fast system clock CLK after the relevant load indication signal Si transits from the first state to the second state while the effective edges of the clock control signals for controlling the remaining switching circuits in heavy load are still formed at the trigger of the preset pulses of the fast system clock CLK corresponding to each clock control signal respectively. When one switching circuit transits from light load to heavy load, the effective edges of the relevant clock control signal are required to regulate back to be formed at the trigger of the preset pulses of the fast system clock CLK again. In one embodiment, if one switching circuit transits from light load to heavy load, the regulation of the relevant clock control signal comprises a plurality of steps, and in each of the steps, regulating the next K effective edges of the relevant clock control signal move forward by one period of the fast system clock CLK, the regulation continues until the effective edges of the relevant clock control signal are formed at the trigger of the preset pulses of the fast system clock CLK corresponding to the relevant clock control signal again, where K is a natural number greater than or equal to 1. In another embodiment, if one switching circuit transits from light load to heavy load, the regulation of the relevant clock control signal comprises a plurality of steps, and in each of the steps, regulating the next K effective edges of the relevant clock control signal move backward by one period of the fast system clock CLK, the regulation continues until the effective edges of the relevant clock control signal are formed at the trigger of the preset pulses of the fast system clock CLK corresponding to the relevant clock control signal again. In this method, when one switching circuit is in light load, the effective edges of the relevant clock control signal are formed at the trigger of the first pulse of the fast system clock CLK after the relevant load indication signal transits from the first state to the second state, thus the output voltage ripple of the switching circuit in light load is decreased.

Logic circuit 10 comprises N control signal generators, each control signal generator has a first input terminal to receive the relevant clock control signal CLKi to control the on moment of the relevant switch, a second input terminal to receive an off signal OFFi to control the off moment of the relevant switch and an output terminal to provide a switching control signal PWMi to control the on and off actions of the relevant switch. In one embodiment, each control signal generator comprises a RS flip-flop, the RS flip-flop has a setting terminal S to receive the clock control signal CLKi, a reset terminal R to receive the off signal OFFi and an output terminal Q to output the switching control signal PWMi to control the on and off actions of the switch Ki. In one embodiment, each switch of the N switching circuits is turned on at the trigger of the rising edge of the switching control signal PWMi, and is turned off at the trigger of the falling edge of the switching control signal PWMi and the on time period Toni of the switching control signal PWMi staying in logic high is determined by the output voltage Voi and the input voltage Vin. In one embodiment, the on time period Toni of the switching control signal PWMi and the preset switching period of the SMPS have an equation illustrated as $Toni=Voi/Vin*T_{SET}$.

Figure 2:
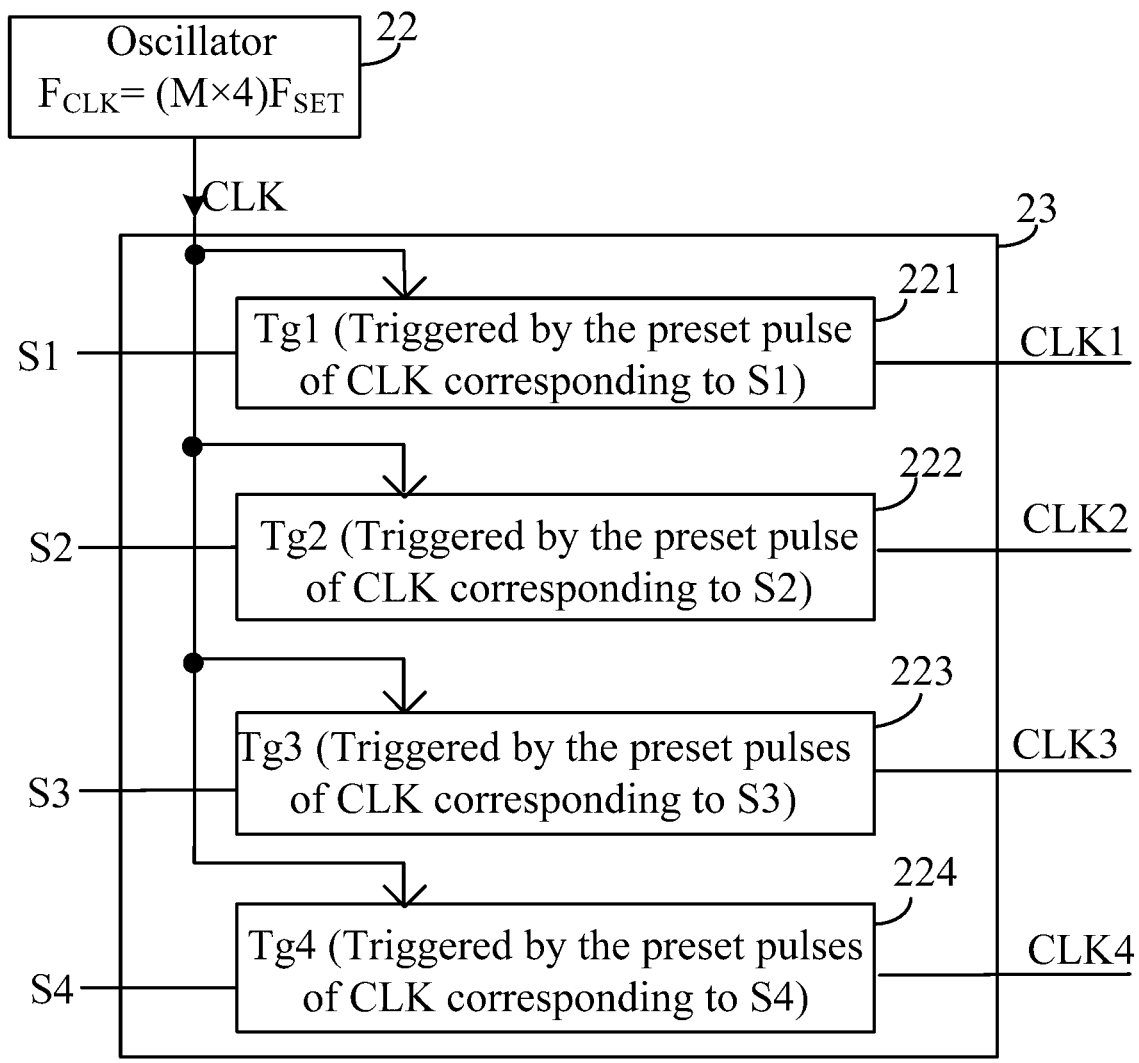
FIG. 2 schematically shows a fast system clock generator 22 and a clock adjusting circuit 23 of a 4-channel SMPS in accordance with an embodiment of the present invention.

FIG. 2 schematically shows a fast system clock generator 22 and a clock adjusting circuit 23 of a 4-channel SMPS in accordance with an embodiment of the present invention. 4-channel SMPS has 4 switching circuits, thus 4 clock control signals CLK1-CLK4 are required to control the on moment of each switch of the 4 switching circuits respectively. It is noted that the number of switching circuits are only for illustration, the SMPS may have N switching circuits, where N is a natural number greater than 1.

Fast system clock generator 22 generates a fast system clock CLK based on a preset switching frequency $F_{SET}$ of the SMPS. The frequency $F_{CLK}$ of the fast system clock CLK and the preset switching frequency $F_{SET}$ of the SMPS have an equation illustrated as $F_{CLK}=(M*4)F_{SET}$, where M is a natural number greater than or equal to 1. Clock adjusting circuit 23 comprises 4 flip-flops Tg1-Tg4, and each flip-flop has a first input terminal, a second input terminal and an output terminal, wherein the first input terminal is coupled to the fast system generator 22 to receive the fast system clock CLK, the second input terminal is configured to receive the relevant load indication signal, and the output terminal is configured to provide the relevant clock control signal based on the relevant load indication signal and the fast system clock CLK.

Still referring to FIG. 2, load indication signals S1-S4 are used to indicate the load status of each switching circuit respectively. In the embodiment shown in FIG. 2, if one load indication signal transits between the first state (such as logic low) and the second state (such as logic high) in several successive periods of the fast system clock CLK, the relevant switching circuit is in light load. If one load indication signal stays in the second state for several successive periods of the fast system clock CLK, the relevant switching circuit is in heavy load.

When the SMPS works in FULL mode, the effective edges of the clock control signals CLK1-CLK4 are formed at the trigger of preset pulses of the fast system clock CLK corresponding to each clock control signal respectively. The clock control signals CLK1-CLK4 have the same frequency as the preset switching frequency $F_{SET}$ of the SMPS, and the phase difference between every two adjacent clock control signals is (360°/4)=90°. In one embodiment, the fast system clock CLK has a frequency 4 times of the preset switching frequency $F_{SET}$ of the SMPS and the effective edges of the clock control signals CLK1-CLK4 are formed at the trigger of the first pulse, the second pulse, the third pulse and the fourth pulse of the fast system clock CLK respectively. In another embodiment, the fast system clock CLK has a frequency 8 times of the preset switching frequency $F_{SET}$ of the SMPS and the effective edges of the clock control signals CLK1-CLK4 are formed at the trigger of the first pulse, the third pulse, the fifth pulse and the seventh pulse of the fast system clock CLK respectively. In another embodiment, the fast system clock signal CLK also has a frequency 8 times of the preset switching frequency $F_{SET}$ of the SMPS, but the effective edges of the clock control signals CLK1-CLK4 are formed at the trigger of the second pulse, the fourth pulse, the sixth pulse and the eighth pulse of the fast system clock CLK respectively.

When the SMPS works in NO-FULL mode, the effective edges of the clock control signal for controlling the switching circuit in light load are formed at the trigger of the first pulse of the fast system clock CLK after the relevant load indication signal transits from the first state to the second state. While the effective edges of the clock control signals for controlling the remaining switching circuits in heavy load are still formed at the trigger of the preset pulses of the fast system clock CLK corresponding to each clock control signal respectively.

Figure 3:
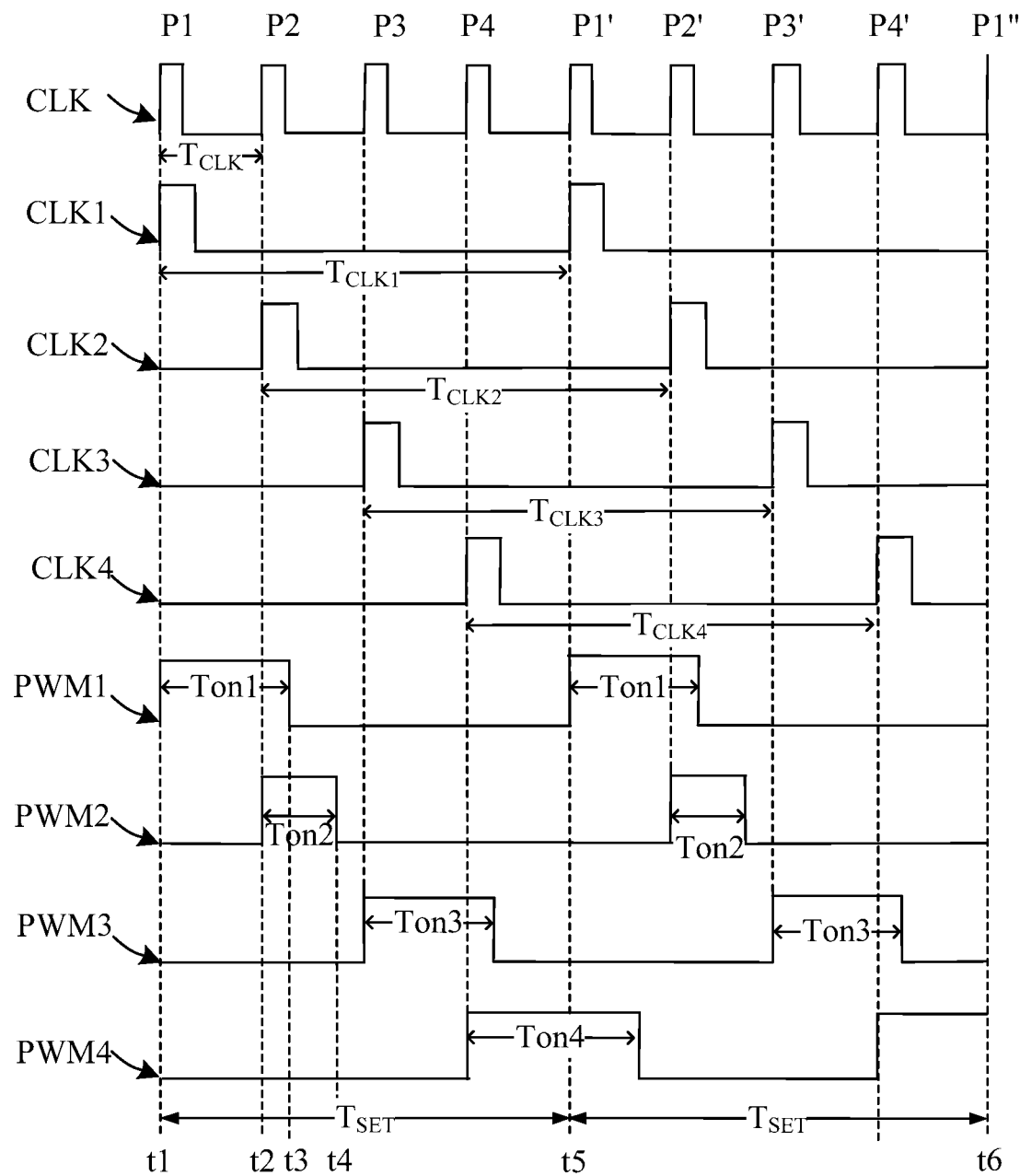
FIG. 3 shows a waveform diagram of the clock control signals CLK1-CLK4 and the switching control signals PWM1-PWM4 in a 4-channel SMPS when the 4-channel SMPS works in FULL mode in accordance with an embodiment of the present invention.

FIG. 3 shows a waveform diagram of the clock control signals CLK1-CLK4 and the switching control signals PWM1-PWM4 in a 4-channel SMPS when the 4-channel SMPS works in FULL mode in accordance with an embodiment of the present invention. The load indication signals S1-S4 stay in logic high always for the 4-channel SMPS works in FULL mode, so the load indication signals S1-S4 are not shown in FIG. 3 for the sake of simplicity.

For a clock signal, the period of the clock signal is defined as the duration from an edge to the next same edge. Take the fast system clock CLK in FIG. 3 for example, the period of the fast system clock CLK is from time t1 (the first rising edge) to time t2 (the next rising edge) and the preset switching period $T_{SET}$ of the SMPS is from time t1 to time t5. In the embodiment shown in FIG. 3, the SMPS works in FULL mode, thus the 4 switching circuits have the same switching period as the preset switching period $T_{SET}$ of the SMPS, the periods of the clock control signals CLK1-CLK4 are the same and equal to the preset period $T_{SET}$ of the SMPS. In FIG. 3, the fast system clock CLK has a frequency 4 times of the preset switching frequency $F_{SET}$ of the SMPS, so there are 4 periods of the fast system clock CLK in the first preset switching period $T_{SET}$ of the SMPS. The pulses of the fast system clock CLK in the first preset switching period $T_{SET}$ are marked with P1, P2, P3 and P4, and the pulses of the fast system clock CLK in the second preset switching period $T_{SET}$ are marked with P1', P2', P3' and P4', where P1 represents the first pulse of the fast system clock CLK in the first preset witching period $T_{SET}$, P2 represents the second pulse of the fast system clock CLK in the first preset switching period $T_{SET}$, P1' represents the first pulse of the fast system clock CLK in the second preset switching period $T_{SET}$ and P2' represents the second pulse of the fast system clock CLK in the second preset switching period $T_{SET}$, and so forth.

In FIG. 3, the first pulse P1 of the fast system clock CLK comes at time t1 and the first clock control signal CLK1 transits from logic low to logic high at the trigger of the first pulse P1 (the rising edge in this embodiment). An effective edge of the first clock control signal CLK1 is formed and the first switching control signal PWM1 transits from logic low to logic high at the trigger of the effective edge of the first clock control signal CLK1 to turn on the first switch K1 of the first switching circuit CH1, where the first pulse P1 is the preset pulse of the fast system clock CLK corresponding to the first clock control signal CLK1. At time t3, the first switching control signal PWM1 transits from logic high to logic low to turn off the switch K1 at the trigger of the first off signal OFF1 (not shown in FIG. 3), the on time period Ton1 of the first switching control signal PWM1 staying in logic high is determined by the on time period Ton1 of the first switching circuit CH1. At time t2, the fast system clock CLK transits from logic low to logic high again, and the second pulse P2 of the fast system clock CLK comes accordingly, the second clock control signal CLK2 transits from logic low to logic high at the trigger of the second pulse P2. An effective edge of the second clock signal CLK2 is formed and the second switching control signal PWM2 transits from logic low to logic high at the trigger of the effective edge of the second clock control signal CLK2 to turn on the second switch K2 of the second switching circuit CH2, where the second pulse P2 is the preset pulse of the fast system clock CLK corresponding to the second clock control signal CLK2. The second switching control signal PWM2 transits from logic high to logic low to turn off the second switch K2 at the trigger of the second off signal OFF2 at time t4. The on time period Ton2 of the second switching control signal PWM2 staying in logic high is determined by the on time period Ton2 of the second switching circuit CH2. In FIG. 3, the third clock control signal CLK3 and fourth clock control signal CLK4 transit from logic low to logic high at the trigger of the third pulse P3 and the fourth pulse P4 respectively and the working principle is nearly the same as the first clock control signal CLK1 and the second clock control signal CLK2 that is not to be described again for the sake of simplicity. At time t5, the first pulse P1' of the fast system clock CLK in the second preset switching period $T_{SET}$ from time t5 to time t6 comes, the second preset switching period $T_{SET}$ of the SMPS starts.

As clearly seen from FIG. 3, the clock control signals CLK1-CLK4 have the same period as the preset switching period $T_{SET}$ of the SMPS. The clock control signals CLK1-CLK4 are triggered in sequence and the phase difference between every two adjacent clock control signals is (360°/4)=90°.

Figure 4:
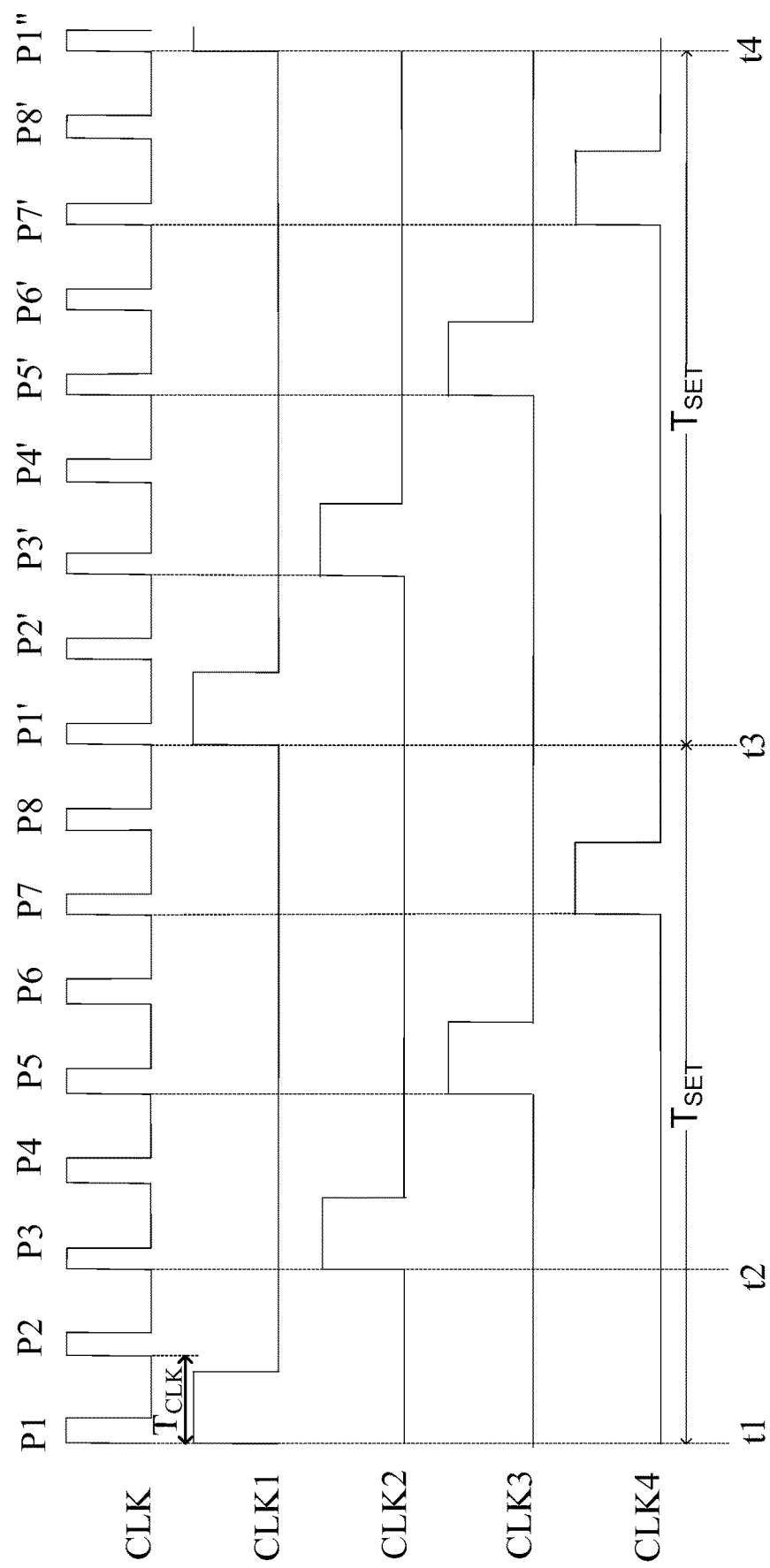
FIG. 4 shows a waveform diagram of the clock control signals CLK1-CLK4 in a 4-channel SMPS when the 4-channel SMPS works in FULL mode in accordance with another embodiment of the present invention.

FIG. 4 shows a waveform diagram of the clock control signals CLK1-CLK4 in a 4-channel SMPS when the 4-channel SMPS works in FULL mode in accordance with another embodiment of the present invention. The SMPS in FIG. 4 is different from the embodiment of FIG. 3 in that the fast system clock CLK in FIG. 4 has a frequency $F_{CLK}$ 8 times of the preset switching frequency $F_{SET}$ of the SMPS while the fast system clock CLK in FIG. 3 has a frequency $F_{CLK}$ 4 times of the preset switching frequency $F_{SET}$ of the SMPS. The load indication signals S1-S4 stay in the second state of logic high always, that the load indication signals S1-S4 are not shown in the FIG. 4 for the sake of simplicity.

Still referring to FIG. 4, for the fast system clock CLK has a frequency 8 times of the preset switching frequency $F_{SET}$ of the SMPS, and the pulses of the fast system clock CLK in the first preset switching period $T_{SET}$ are marked with P1, P2, P3, P4, P5, P6, P7 and P8, and the pulses of the fast system clock CLK in the second preset switching period $T_{SET}$ are marked with P1', P2', P3', P4', P5', P6', P7' and P8', and the pulses of the fast system clock CLK in the third preset switching period $T_{SET}$ are marked with P1", P2", P3", P4", P5", P6", P7" and P8", where P1 represents the first pulse of the fast system clock CLK in the first preset switching period $T_{SET}$, P2 represents the second pulse of the fast system clock CLK in the first preset switching period $T_{SET}$, P1' represents the first pulse of the fast system clock CLK in the second preset switching period $T_{SET}$ and P1" represents the first pulse of the fast system clock CLK in the third preset switching period $T_{SET}$, and so forth.

In FIG. 4, the first pulse P1 of the fast system clock CLK comes at time t1, the first clock control signal CLK1 transits from logic low to logic high at the trigger of the first pulse P1, and an effective edge of the first clock control signal CLK1 is formed. At time t2, the second clock control signal CLK2 transits from logic low to logic high at the trigger of the third pulse P3 and an effective edge of the second clock control signal CLK2 is formed. Similarly, an effective edge of the third clock control signal CLK3 is formed at the trigger of the fifth pulse P5 and an effective edge of the fourth clock control signal CLK4 is formed at the trigger of the seventh pulse P7. The preset switching period $T_{SET}$ of the SMPS is from time t1 to time t3. At time t3, the first pulse P1' of the fast system clock CLK in the second preset switching period $T_{SET}$ comes, and the SMPS starts the second preset switching period $T_{SET}$.

As clearly seen from FIG. 4 that, the clock control signals CLK1-CLK4 have the same period as the preset switching period $T_{SET}$ of the SMPS, the clock control signals CLK1-CLK4 are triggered in sequence, and the phase difference between every two adjacent clock control signals is 90°. The switching control signals PWM1-PWM4 are generated based on the clock control signals CLK1-CLK4 and the on time periods Ton1-Ton4 of each switching circuit respectively (not shown in FIG. 4).

Figure 5:
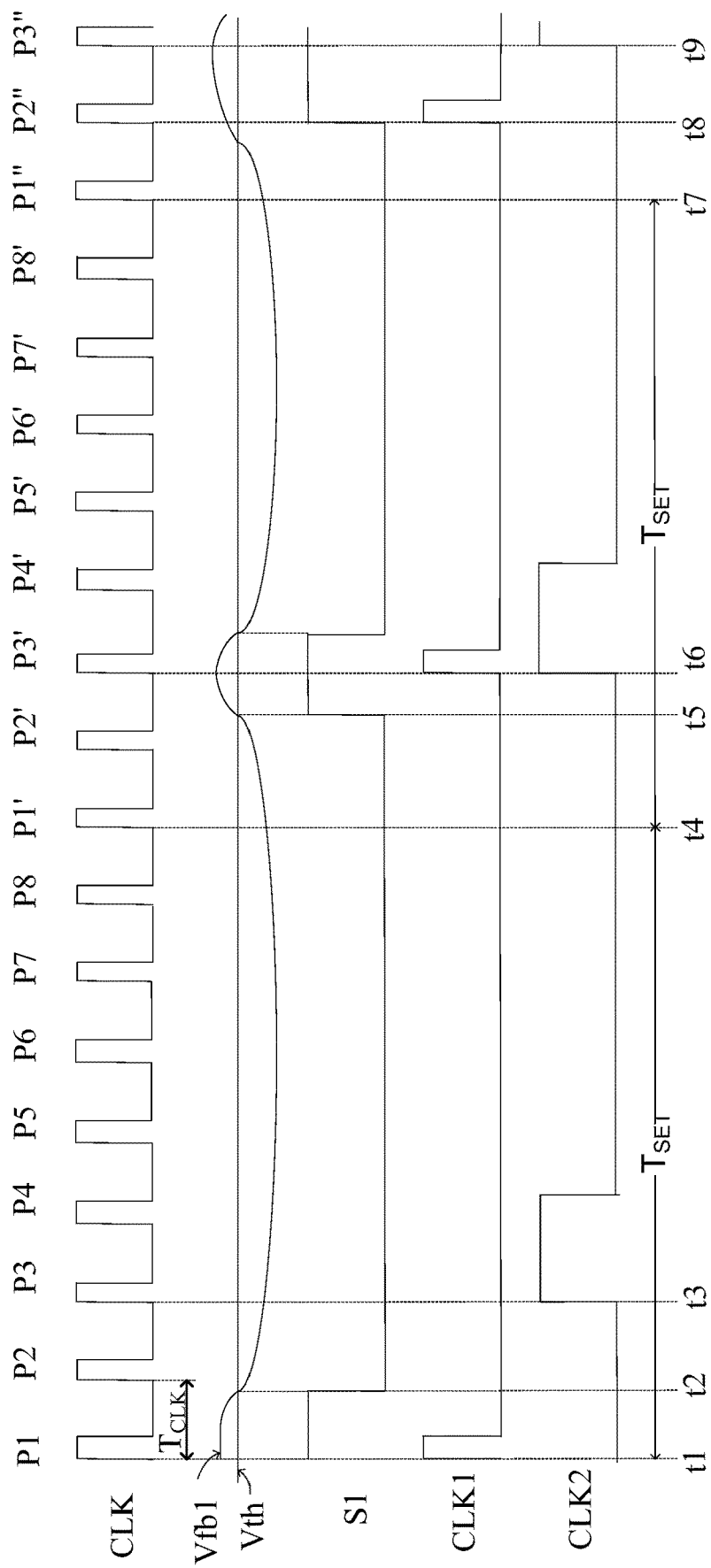
FIG. 5 shows a waveform diagram of a 4-channel SMPS when the first switching circuit CH1 skips from heavy load to light load in accordance with an embodiment of the present invention.

FIG. 5 shows a waveform diagram of a 4-channel SMPS when the first switching circuit CHN1 skips from heavy load to light load in one embodiment of the present invention. When one switching circuit is in light load, the effective edges of the relevant clock control signal is formed at the trigger of the first pulse of the fast system clock CLK after the relevant load indication signal transits from the first state to the second state, and the effective edges of the clock control signals for controlling the remaining switching circuits in heavy load are still formed at the trigger of the preset pulses of the fast system clock CLK corresponding to each clock control signal respectively.

In FIG. 5, the first switching circuit CH1 is in light load while the remaining switching circuits are in heavy load. It should be known that here the first switching circuit CH1 in light load is only for illustration, any other switching circuit can be in light load and the working principle is nearly the same as the first switching CH1 which is not described again for the sake of simplicity.

In the embodiment shown in FIG. 5, the first load indication signal S1 is generated by comparing the threshold voltage Vth with the first feedback signal Vfb1 indicative of the first output voltage Vo1, the first feedback signal Vfb1 is inversely proportional to the first output voltage Vo1, the first feedback signal Vfb1 decreases when the first output voltage Vo1 increases. In the embodiment shown in FIG. 5, when the load of the first switching circuit CH1 decreases, the first output voltage Vo1 increases, and the first feedback signal Vfb1 decreases accordingly. The first load indication signal S1 transits from the second state of logic high to the first state of logic low when the first feedback signal Vfb1 becomes smaller than the threshold voltage Vth.

In the embodiment shown in FIG. 5, the fast system clock CLK has a frequency $F_{CLK}$ 8 times of the preset switching frequency $F_{SET}$ and the pulses of the fast system clock CLK in the first preset switching period $T_{SET}$ are marked with P1, P2, P3, P4, P5, P6, P7 and P8, and the pulses of the fast system clock CLK in the second preset switching period $T_{SET}$ are marked with P1', P2', P3', P4', P5', P6', P7' and P8', and the pulses of the fast system clock CLK in the third preset switching period $T_{SET}$ are marked with P1", P2", P3", P4", P5", P6", P7" and P8", where P1 represents the first pulse of the fast system clock CLK in the first preset switching period $T_{SET}$, P2 represents the second pulse of the fast system clock CLK in the first preset switching period $T_{SET}$, P1' represents the first pulse of the fast system clock CLK in the second preset switching period $T_{SET}$ and P1" represents the first pulse of the fast system clock CLK in the third preset switching period $T_{SET}$, and so forth. The working principle when the first switching circuit CH1 in light load is different from the work principle when the first switching circuit CH1 is in heavy load in that the effective edges of the first clock control signal CLK1 are formed at the trigger of the first pulse of the fast system clock CLK after the first load indication signal S1 transits from the first state to the second state when the first switching circuit CH1 works in light load, while the effective edges of the first clock control signal CLK1 are formed at the trigger of the preset pulses (P1, P1' and P1") of the fast system clock CLK corresponding to the first clock control signal CLK1 when the first switching circuit CH1 works in heavy load, the detailed working waveforms are shown in FIG. 5.

In the waveform of FIG. 5, at time t1, the first switching circuit CH1 is in heavy load and the first effective edge of the first clock control signal CLK1 is formed at the trigger of the preset pulse P1 of the fast system clock CLK corresponding to the first clock control signal CLK1. And then the first load indication signal S1 transits between the first state of logic low and the second state of logic high in several successive periods of the fast system clock CLK which means the first switching circuit CH1 enters to light load. In FIG. 5, the first preset switching period $T_{SET}$ is from time t1 to time t4, and the second preset switching period $T_{SET}$ is from time t4 to time t7.

Still referring to FIG. 5, at time t2, the first feedback signal Vfb1 becomes smaller than the threshold voltage Vth so the first load indication signal S1 transits from logic high to logic low accordingly. The first feedback signal Vfb1 is smaller than the threshold voltage Vth until time t5, the first feedback signal Vfb1 becomes bigger than the threshold voltage Vth again at time t5, and the first load indication signal S1 transits from logic low to logic high accordingly. The third pulse P3' is the first pulse of the fast system clock CLK after the first load indication signal S1 transits from logic low to logic high, so an effective edge of the first clock control signal CLK1 is formed at the trigger of the third pulse P3' at time t6. Similarly, the second pulse p2" is also the first pulse of the fast system clock CLK after the first load indication signal S1 transits from logic low to logic high, so a next effective edge of the first clock control signal CLK1 is formed at the trigger of the second pulse P2" at time t8. Here the third pulse P3' and the second pulse P2" are only for illustration, any pulse of the fast system clock CLK can be the first pulse of the fast system clock CLK after the first load indication signal S1 transits from logic low to logic high depending on the load condition.

Still referring to FIG. 5, the second switching circuit CH2 is in heavy load that the effective edges of the second clock control signal CLK2 are still formed at the trigger of the preset pulses of the fast system clock CLK corresponding to the second clock control signal CLK2. Thus a first effective edge of the second clock control signal CLK2 is formed at the trigger of the third pulse P3 at time t3, and a second effective edge of the second clock control signal CLK2 is formed at the trigger of a third pulse P3' at time t6, and the third effective edge of the second clock control signal CLK2 is formed at the trigger of the third pulse p3" at time t9.

As described above, when one or more switching circuits are in light load, the effective edges of the clock control signals for controlling the relevant switching circuits are no longer formed at the trigger of the preset pulses of the fast system clock CLK corresponding to each clock control signal respectively, but are formed at the trigger of the first pulses of the fast system clock CLK after the relevant load indication signals transit from the first state to the second state.

Figure 6:
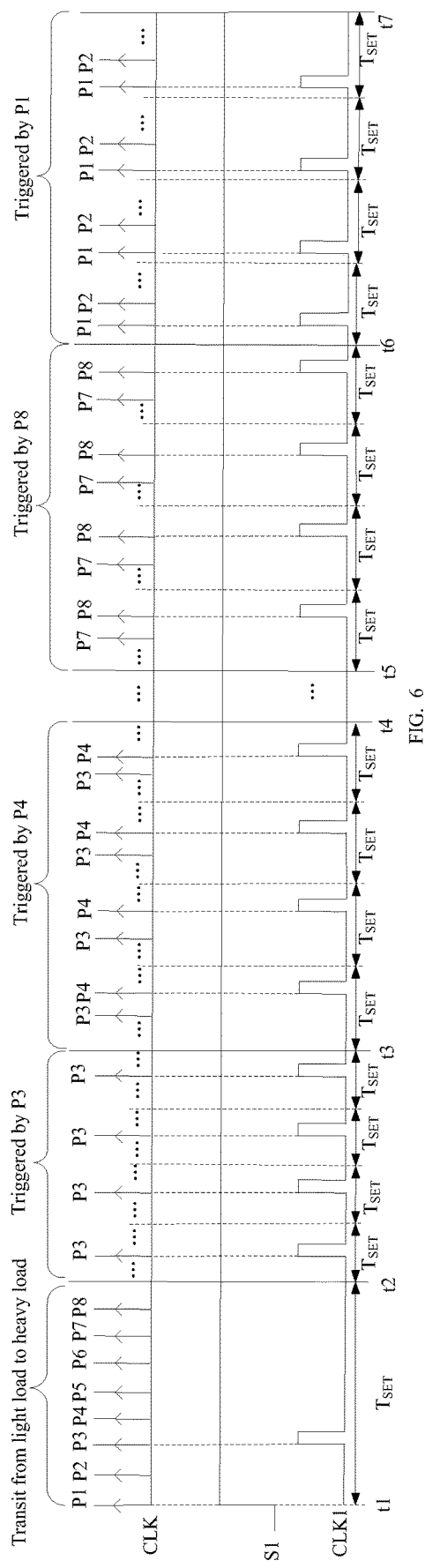
FIG. 6 shows a waveform diagram of a 4-channel SMPS when the first switching circuit CH1 skips from light load to heavy load in accordance with an embodiment of the present invention.

FIG. 6 shows a waveform diagram of a 4-channel SMPS when the first switching circuit CH1 skips from light load to heavy load in accordance with an embodiment of the present invention. In FIG. 6, the fast system clock CLK has a frequency $F_{CLK}$ 8 times of the preset switching frequency $F_{SET}$ of the SMPS. Here taking the first switching circuit CH1 skips from light load to heavy load for example, the working principle of the other switching circuits are similar. For one switching circuit, if the relevant load indication signal stays in the second state for L successive periods of the fast system clock CLK, the relevant switching circuit enters to heavy load, where L is determined by the parameters of the SMPS. In the embodiment shown in FIG. 6, L is 8, which means if the first load indication signal S1 stays in logic high for 8 successive periods of the fast system clock CLK, the first switching circuit CH1 enters to heavy load. In another embodiment, L is a natural number greater than or equal to 1.

In the embodiment shown in FIG. 6, the first load indication signal S1 transits from logic low to logic high at time t1, the first load indication signal S1 stays in logic high for 8 successive periods of the fast system clock CLK, which means the first switching circuit CH1 skips from light load to heavy load. In FIG. 6, the duration from time t1 to time t2 is a transition period for the first switching circuit CH1 transiting from light load to heavy load. In the embodiment shown in FIG. 6, when the first switching circuit CH1 is in light load, the effective edge of the first clock control signal CLK1 is formed at the trigger of the first pulse of the fast system clock CLK after the first load indication signal S1 transits from the first state to the second state, not the preset pulse of the fast clock signal CLK corresponding to the first clock control signal CLK1. So when the first switching circuit CH1 skips from the light load to heavy load, the effective edge of the first clock control signal CLK1 is required to be regulated at the trigger of the preset pulse of the fast clock signal CLK corresponding to the first clock control signal CLK1. In FIG. 6, when the first switching circuit CH1 skips from light load to heavy load, the first pulse of the fast system clock CLK after the first load indication signal S1 transits from the first state to the second state is the third pulse P3. It should be know that, here the third pulse P3 is only for illustration, any pulse can be the triggering pulse depending on the detailed condition when the SMPS leaves light load.

The regulation of the effective edges of the first clock control signal CLK1 comprises a plurality of steps, and in each of the steps, regulating the next K effective edges of the first clock control signal CLK1 moves forward or backward by one period of the fast system clock CLK, where K is determined by the parameter of the SMPS. In one embodiment, K is a natural number greater than or equal to 1. The regulation of the effective edges of the first clock control signal CLK1 shown in FIG. 6 is regulating the next 4 effective edges of the first clock control signal CLK1 move forward by one period of the fast system clock in each of the steps. As shown in FIG. 6, the effective edges of the first clock control signal CLK1 in the 4 preset switching periods $T_{SET}$ from time t2 to time t3 are formed at the trigger of the third pulse P3, and the effective edges of the first clock control signal CLK1 in the 4 preset switching periods $T_{SET}$ from t3 to time t4 are formed at the trigger of the fourth pulse P4. There are 12 preset switching periods from t4 to time t5, and the effective edges of the first clock control signal CLK1 in the front group of 4 preset switching periods $T_{SET}$ are formed at the trigger of the fifth pulse P5, the effective edges of the first clock control signal CLK1 in the middle group of the 4 preset switching periods are formed at the trigger of the sixth pulse P6, the effective edges of the first clock control signal CLK1 in the last group of the 4 preset switching periods are formed at the trigger of the seventh pulse P7, the detailed pulses of the fast system clock CLK from time t4 to time t5 are not shown in FIG. 6 for the sake of simplicity. The effective edges of the first clock control signal CLK1 are regulated to be formed at the trigger of the preset pulse (the first pulse P1) of the fast system clock CLK corresponding to the first clock control signal CLK1 in the 4 preset switching periods $T_{SET}$ from time t6 to time t7. As described above, when the first switching circuit CHN1 skips from light load to heavy load, regulating the next 4 effective edges of the first clock control signal CLK1 moves forward by one period of the fast system clock CLK in each of the step, the regulation continues until the effective edges of the first clock control signal CLK1 are regulated back to be formed at the trigger of the preset pulse (the first pulse P1) of the fast system clock CLK corresponding to the first clock control signal CLK1.

Figure 7:
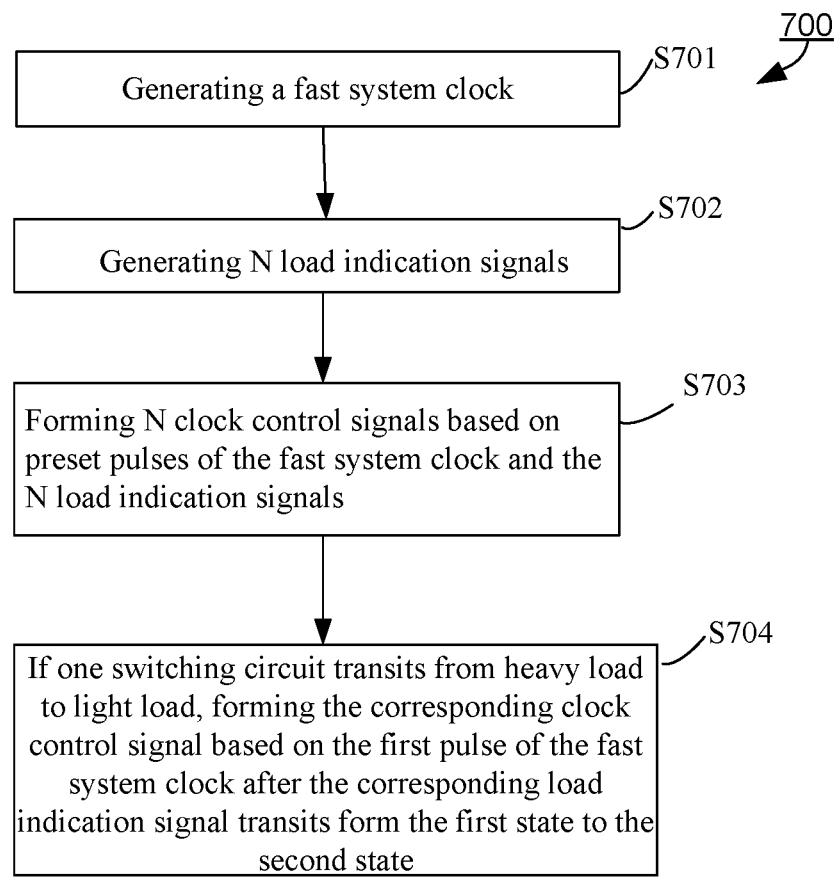
FIG. 7 shows a workflow of method 400 for generating N clock control signals to control N switching circuits in accordance with an embodiment of the present invention.

FIG. 7 shows a workflow of method 400 for generating N clock control signals to control N switching circuits in accordance with an embodiment of the present invention. For a SMPS having N switching circuits for converting an input voltage to N output voltages independently, each of the N switching circuits has a switch, so N clock control signals CLK1-CLKN are required to control the switching action of each switch of N switching circuits. Method 400 comprises steps S701-S704, in step S701, generating a fast system clock based on a preset switching frequency of the SMPS. The fast system clock CLK has a frequency (M*N) times of the preset switching frequency $F_{SET}$ of the SMPS, M is a natural number greater than or equal to 1. In step S702, generating N load indication signals by comparing the N output voltages with a threshold voltage. The N load indication signals have a first state and a second state to indicate load statuses of the N switching circuits respectively. In step S703, forming N clock control signals based on preset pulses of the fast system clock and the N load indication signals, each of the N clock control signals is configured to control the on moment of the switch in each of the N switching circuits, the N clock control signals have the same frequency as the preset switching frequency and phase difference between every two adjacent clock control signals is (360°/N). In step S704, if one of the N switching circuits is detected to transit from heavy load to light load, forming the corresponding clock control signal based on the first pulse of the fast system clock after the corresponding load indication signal transits from the first state to the second state. Method 700 further comprises, when the switching circuit in light load is detected back to the heavy load, regulating the corresponding clock control signal to be formed based on the preset pulses of the fast system clock. In one embodiment, the corresponding clock control signal is regulated in a plurality of steps, and in each of the steps, the corresponding clock control signal is regulated to move forward by one period forward of the fast system clock, until the corresponding clock control signal is formed based on the preset pulses of the fast system clock. In another embodiment, the corresponding clock control signal is regulated in a plurality of steps, and in each of the steps, the corresponding clock control signal is regulated to move forward by one period forward of the fast system clock, until the corresponding clock control signal is formed based on the preset pulses of the fast system clock. In one embodiment, if one load indication signal stays in the second state for L successive periods of the fast system clock CLK, the relevant switching circuit is in heavy load, where L is a natural number greater than or equal to 1. In one embodiment, if one load indication signal transits between the first state and the second state in several successive periods of the fast system clock CLK, the relevant switching circuit is in light load.

In above embodiment, "the first state" refers to logic low of low voltage, and "the second state" refers to logic high of high voltage, but it should be know that, in some other embodiments, "the first state" can be high voltage and "the second state" is the low voltage.

This written description uses examples to disclose the invention, including the best mode, and also to enable a person skilled in the art to make and use the invention. The patentable scope of the invention may include other examples that occur to those skilled in the art.

What is claimed is:

1. A method for controlling a multi-channel SMPS, the multi-channel SMPS comprises N switching circuits for converting an input voltage to N output voltages, each of the N switching circuits has a switch, wherein N is a natural number greater than 1, the method comprising:
generating a fast system clock based on a preset switching frequency of the multi-channel SMPS;
generating N load indication signals by comparing each of the N output voltages separately with a threshold voltage, wherein each of the N load indication signals having a first state and a second state is configured to indicate load status of the N switching circuits respectively;
forming N clock control signals based on preset pulses of the fast system clock and the N load indication signals, each of the N clock control signals is configured to control the on moment of the switch in each of the N switching circuits, the N clock control signals have the same frequency as the preset switching frequency and phase difference between every two adjacent clock control signals is (360°/N°); and
if one of the N switching circuits is detected to transit from a heavy load condition to a light load condition, forming the corresponding clock control signal based on the first pulse of the fast system clock after the corresponding load indication signal transits from the first state to the second state.

2. The method of claim 1, further comprising: when the switching circuit in the light load condition is detected back to the heavy load condition, regulating the corresponding clock control signal to be formed based on the preset pulses of the fast system clock.

3. The method of claim 2, wherein regulating the corresponding clock control signal comprises a plurality of steps, and wherein in each of the steps, the corresponding clock control signal is moved forward by one period of the fast system clock, until it reaches the preset pulses of the fast system clock.

4. The method of claim 2, wherein regulating the corresponding clock control signal comprises a plurality of steps, and wherein in each of the steps, the corresponding clock control signal is moved backward by one period of the fast system clock, until it reaches the preset pulses of the fast system clock.

5. The method of claim 1, wherein if one of the N load indication signals stays in the second state for a plurality of successive periods of the fast system clock, the corresponding switching circuit is detected to be in the heavy load condition.

6. The method of claim 1, wherein if one of N the load indication signals transits between the first state and the second state for several successive periods of the fast system clock, the corresponding switching circuit is detected to be in the light load condition.

7. A multi-channel SMPS, comprising:
N switching circuits configured to convert an input voltage to N output voltages, wherein each of the N switching circuits has a switch and N is a natural number greater than 1;
a controller configured to generate N clock control signals, wherein each of the N clock control signals is configured to control the on moment of the switch in each of the N switching circuits, wherein the controller comprises:
a mode detection circuit configured to provide N load indication signals, wherein each of the N load indication signals has a first state and a second state to indicate load status of each of the N switching circuits;
a fast system clock generator configured to provide a fast system clock based on a preset switching frequency of the multi-channel SMPS; and
a clock adjusting circuit having N flop-flops configured to provide N clock control signals based on the fast system clock and the N load indication signals, the N clock control signals have the same frequency as the preset switching frequency, and phase difference between every two adjacent clock control signals is (360°/N°); and
a logic circuit having N control signal generators to provide N switching control signals to control the off moment of the switch in each of the N switching circuits.

8. The multi-channel SMPS of claim 7, wherein the mode detection circuit comprises N load detecting circuits for providing N load indication signals by comparing each of the N feedback signals indicative of the N output voltages separately with a threshold voltage.

9. The multi-channel SMPS of claim 7, wherein if one of the N switching circuits is detected to transit from a heavy load condition to a light load condition, the corresponding clock control signal is formed based on the first pulse of the fast system clock after the corresponding load indication signal transits from the first state to the second state.

10. The multi-channel SMPS of claim 9, when the switching circuit in the light load condition is detected back to the heavy load condition, the corresponding clock control signal is regulated to be formed based on the preset pulses of the fast system clock.

11. The multi-channel SMPS of claim 10, wherein the corresponding clock control signal is regulated to be formed based on the preset pulses of the fast system clock in a plurality of steps, and wherein in each of the steps, the corresponding clock control signal is moved forward by one period of the fast system clock, until it reaches the preset pulses of the fast system clock.

12. The multi-channel SMPS of claim 10, wherein the corresponding clock control signal is regulated to be formed based on the preset pulses of the fast system clock in a plurality of steps, and wherein in each of the steps, the corresponding clock control signal is moved backward by one period of the fast system clock, until it reaches the preset pulses of the fast system clock.

13. The multi-channel SMPS of claim 9, wherein if one of the N load indication signals stays in the second state for a plurality of successive periods of the fast system clock, the corresponding switching circuit is detected to be in the heavy load condition.

14. The multi-channel SMPS of claim 9, wherein if one of the N load indication signals transits between the first state and the second state for several successive periods of the fast system clock, the corresponding switching circuit is detected to be in the light load condition.

15. A controller for controlling a multi-channel SMPS, the multi-channel SMPS having N switching circuits for converting an input voltage to N output voltages, and each of the N switching circuits has a switch, N is a natural number greater than 1, the controller comprising:
a mode detection circuit configured to provide N load indication signals, wherein each of the N load indication signals has a first state and a second state to indicate load status of each of the N switching circuits;

a fast system clock generator configured to provide a fast system clock based on a preset switching frequency of the multi-channel SMPS; and a clock adjusting circuit having N flip-flops configured to provide N clock control signals based on the fast system clock and the N load indication signals, the N clock control signals have the same frequency as the preset switching frequency, and phase difference between every two adjacent clock control signals is (360°/N°).

16. The controller of claim 15, wherein the mode detection circuit comprises N load detecting circuits for providing N load indication signals by comparing each of N feedback signals indicative of the N output voltages separately with a threshold voltage.

17. The controller of claim 15, wherein if one of the N switching circuits is detected to transit from a heavy load condition to a light load condition, the corresponding clock control signal is formed based on the first pulse of the fast system clock after the corresponding load indication signal transits from the first state to the second state.

18. The controller of claim 17, when the switching circuit in the light load condition is detected back to the heavy load condition, the corresponding clock control signal is regulated to be formed based on the preset pulses of the fast system clock.

19. The controller of claim 18, wherein the corresponding clock control signal is regulated to be formed based on the preset pulses of the fast system clock in a plurality of steps, and wherein in each of the steps, the corresponding clock control signal is moved forward by one period of the fast system clock, until it reaches the preset pulses of the fast system clock.

20. The controller of claim 18, wherein the corresponding clock control signal is regulated to be formed based on the preset pulses of the fast system clock in a plurality of steps, and wherein in each of the steps, the corresponding clock control signal is moved backward by one period of the fast system clock, until it reaches the preset pulses of the fast system clock.

* * * * *